April 2, 1968 J. HANDLEY 3,376,409

INFORMATION STORAGE DEVICES

Filed June 18, 1962 2 Sheets-Sheet 1

United States Patent Office 3,376,409

Patented Apr. 2, 1968

3,376,409
INFORMATION STORAGE DEVICES

John Handley, 39 Wilhelmina Ave., Coulsdon, Surrey, England

Filed June 18, 1962, Ser. No. 203,387
Claims priority, application Great Britain, June 16, 1961, 21,758/61
6 Claims. (Cl. 235—61.11)

ABSTRACT OF THE DISCLOSURE

Information storage equipment, in which information is written on and/or read from flat sheet-like members of any desired shape; usually rectangular cards, although circular discs, for instance, can be used; which members are stacked in a container or containers, and are mechanically withdrawn therefrom, for writing and/or reading purposes and mechanically returned thereto thereafter.

While actual withdrawal and return are mechanical, such operations are usually electrically controlled, although the invention is not limited in its application to any particular method of control.

The information may be stored in the form of punched holes, or by colour contrasts detectable by photo-sensitive means, or any other method of storage, but preferably by magnetic storage.

The cards can be of sheet or plate material, which, for magnetic storage, would be coated on one or both sides with magnetic material, or can for magnetic storage purposes, be arrays of magnetisable wires or strips in frames.

The object of the invention is to improve the availability of such stored information.

The main aspect of the invention comprises information storage equipment wherein information is written on flat sheet-like members stacked side by side in containers, and which comprises two sets of member extraction and return equipment for concurrently extracting and returning two members from opposed sides of a container, and two writing and/or reading means for concurrently writing or reading two members.

My application No. 60,395, filed October 4, 1960, now Patent No. 3,276,002, describes a card extraction and reading equipment in which the cards are individually withdrawn vertically from the container, and returned thereto after being written or read.

The said patent describes in detail mechanisms for selecting, withdrawing, and processing the cards, all of which can be utilised in carrying out the present invention, so that no detailed drawings or description of such mechanisms are required in the description of the present invention.

With my previous application in mind, the present invention will be adequately described by the following description of an embodiment thereof shown in the accompanying drawing in which.

Figure 1:
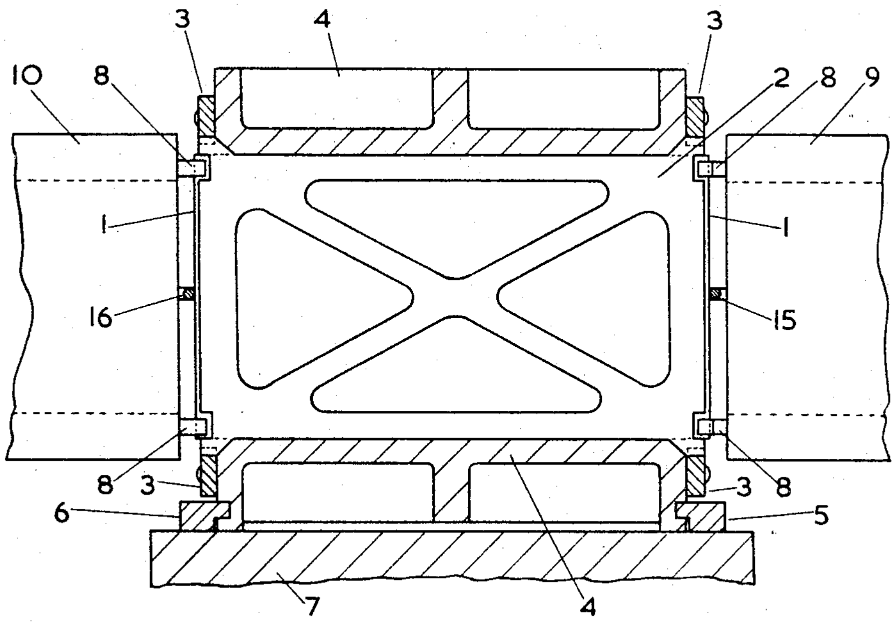
FIG. 1 is a partial end elevation of a card storage, extraction, processing, and re-insertion equipment, partly in section.

Whereas the cards in my aforesaid application were located in vertical slots in an open topped box or frame for extraction vertically upwards, in the present equipment the container is made open at both sides with opposed guide slots in the floor and the ceiling of the container, and whereas in my previous application a single travelling head unit traversed horizontally over the open top of the card container, in the present equipment two separate and independent travelling head units traverse horizontally one on each side of the container.

The cards 1 are located between Bakelite separators 2 which in turn are located in die cast rack plates 3 which are made in sections and accurately positioned and screwed to magazine 4.

The magazine 4 is located between guide rails 5 and 6 screwed to the base 7.

The travelling head units 9 and 10 of the same construction as in my aforesaid application are traversed as before by binary compressed air cylinders to the required card by means described in my aforesaid application and the grippers 8 are then moved in to grip the selected card and draw it out past the magnetic reading and writing heads 11 or 12 to receive or transmit information from or to the computer. The pressure blocks 13 or 14 are supplied with compressed air at low pressure to keep the card in contact with the reading heads 11 or 12, as in my aforesaid application.

Although the cards must be capable of extraction laterally in both horizontal directions, it is essential to ensure that they do not shift laterally other than under the influence of the positive extraction grippers 8. For this purpose automatically adjustable means are provided at each side of the container for containing the cards against lateral movement in the container, except for a gap, adequate for the insertion of the grippers 8: the position of the gap automatically follows the position of the corresponding travelling head unit 9 or 10.

In the preferred means, two pairs of pulleys (not shown) are mounted on each side of the container. Each pair of pulleys are vertically spaced, one substantially horizontally in line with the string or tape 15, FIGS. 1 and 2, and the other above or below the vertical height of the travelling head unit. The two pairs of pulleys at each side of the container are positioned just beyond the two extremes of travel of the travelling head unit.

The string or tape 15, of nylon or any other suitable non-expansible material, is passed around all four pulleys and its ends are fixed to opposite sides of the gripper mounting in the travelling head.

Thus the string or tape 15 is moved around the pulleys as the travelling head unit moves, the gap between its ends is always positioned for movements of the grippers 8, and the horizontal runs of the string or tape along the edges of the cards holds them laterally in position.

Alternatively, telescopic rods or plates could be located between each side of the travelling head unit and fixed supports at the corresponding extremes of travel of the unit, in close proximity to the cards. Any other suitable means could be used for this purpose.

The gap itself could normally be closed by a spring-controlled gate or pawl, which would be opened in response to, or at the same time as, the forward movement of the grippers 8 to extract a card, although the end of the gripper itself might perform this function.

A vertical stack of card containers could be located between the travelling head units, arranged for vertical adjustment by compressed air cylinders, to bring any one of the containers horizontal in line with the travelling head units, in the same way that a plurality of containers was arranged for horizontal movement to position any one of them under a single travelling head unit.

In some applications it might be possible to arrange that the two travelling head units would never select the same card. However, this possibility might be unavoidable in other applications.

In such circumstances, means would be provided automatically to detect the occurrence of a simultaneous demand for the same card, and to take suitable action.

Figure 3:
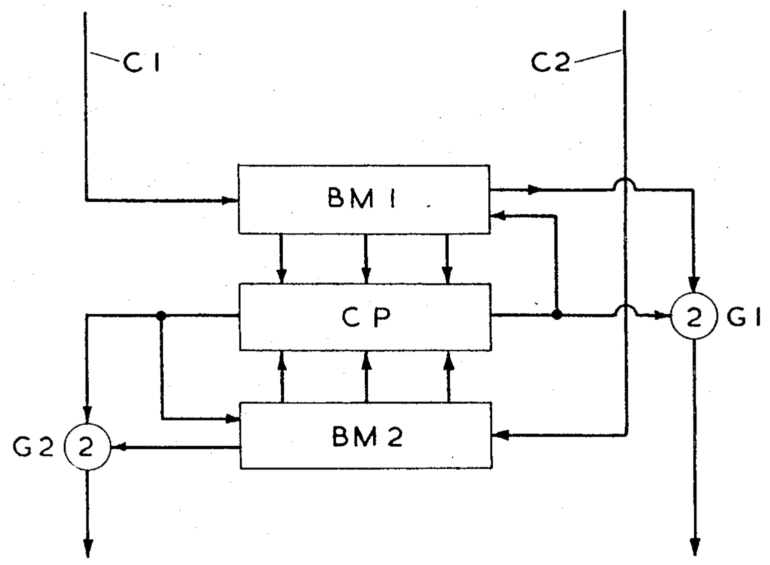
FIGURE 3 is a block diagram of circuit structure useful with the apparatus of FIGURES 1 and 2.

Referring to FIG. 3, multi-bit binary selection code transmission channels C1, C2 towards the two selection controls of the two travelling head units, are connected to bistable multivibrators BM1, BM2, corresponding stages of which are connected to a like number of stages of a comparator CP. Any simultaneous transmissions of card addresses in channels C1, C2 are temporarily stored in BM1 and BM2 and are automatically applied to the comparator CP.

The comparator CP will automatically signal NO COMPARISON in well-known manner to BM1, BM2 via G1, G2, in response to which BM1 and BM2 will automatically transmit the addresses to the selection controls of the travelling head units.

If the comparator CP finds that the addresses being compared are identical, it will be arranged to signal to BM1 and BM2 in turn with a time-lag such that the card will have been returned after reading by the first unit before the second unit attempts to extract it. Any other suitable action could be taken such as a signal back to the address source, which would be arranged to react accordingly.

While in the preferred embodiment described, the cards are extracted horizontally, it is within the scope of the invention to extract them vertically upwards and downwards. This will necessitate some form of support or locater below the cards through which the grippers 8 can pass at any desired position and extract and return a card. Thus a parallel array of downwardly tapered slats can be spring pressed together from one or both ends on guide rods, and can be parted at any desired point by the grippers 8. Such a locater would preferably be provided above as well as below the cards to ensure even action by the upper and lower grippers.

In this case, a plurality of card containers could be arranged side by side as in my aforesaid application.

Figure 2:
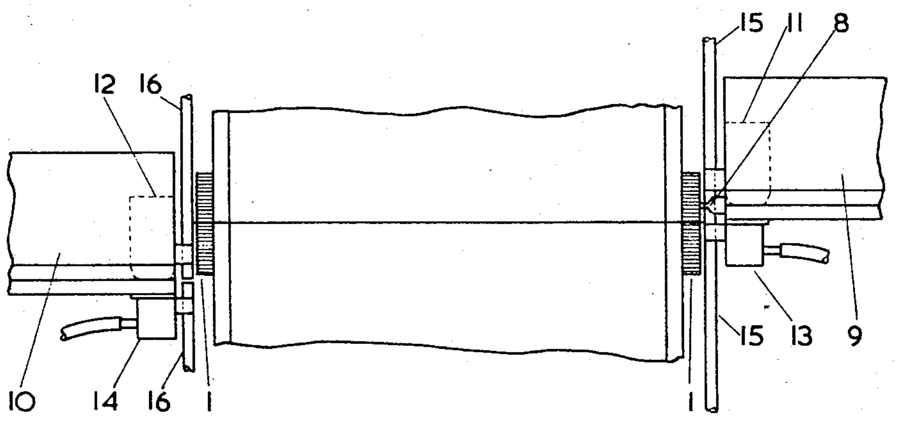
FIG. 2 is a plan view of the equipment shown in FIG. 1.

The string or tape 15, FIGS. 1 and 2, together with the gate or pawl in the gap, could alternatively be provided below the cards to hold them in position. Again, an array of slats could replace each string 15 in FIGS. 1 and 2.

Instead of the electrical comparator of FIG. 3, mechanical interlocks could be provided for preventing any attempt to extract the same card in both directions concurrently.

Any desired form of card extraction and return means can be used.

What I claim is:

1. Information storage equipment wherein information is written on flat sheet-like members stacked side by side in containers, and which comprises two sets of member extraction and return equipment for extracting and returning members from opposed sides of a container, separate information transfer means for the said opposed sides respectively to write upon and read from, said member extracted from the corresponding side of the container and adjustable card-containing means on said opposed sides for containing cards in a container said means comprising, for each side, two lengths of containing material extending along a side from opposite ends of the side to within a distance from each other adequate for insertion of card extraction and return means and which are variable in length in a complementary manner so that the distance between their ends remains constant but varies in position in accordance with the position of said card extraction and return means, whereby cards can be extracted from opposite sides of said container and read at the same time.

2. Information storage equipment as claimed in claim 1, wherein said card-containing means for each side consists of a flexible length of material, the ends of which are fixed to opposite sides of a travelling unit carrying said card extraction and return means and said information transfer means and which passes therefrom in opposite directions along the side of the container and around pulleys beyond the two limits of travel of said travelling unit so as to be held taut and to be reciprocable in response to movement of said travelling unit.

3. Information storage equipment as claimed in claim 1, wherein said card-containing means for each side is a complementary pair of telescopic members.

4. Information storage equipment as claimed in claim 1, wherein said card-containing means for each side is an array of parallel outwardly tapered slats which are mounted so as to be movable to provide a gap between any two slats for passage of said card-extraction and return means.

5. Information storage equipment as claimed in claim 1, comprising means for automatically ensuring that said two card extraction and return means do not attempt to select the same card concurrently.

6. Information storage equipment as claimed in claim 1, wherein said ensuring means comprises electrical card address comparing means.

References Cited

UNITED STATES PATENTS

| | | | |
|---|---|---|---|
| 2,918,656 | 12/1959 | Nolde | 340—173 |
| 3,176,279 | 3/1965 | Lin | 340—174.1 |
| 2,605,965 | 8/1952 | Shepherd | 235—61.6 |

MAYNARD R. WILBUR, *Primary Examiner.*

DARYL W. COOK, *Examiner.*

R. COUNCIL, T. J. SLOYAN, *Assistant Examiners.*